United States Patent [19]

Roberts

[11] 4,289,966
[45] Sep. 15, 1981

[54] RADIATION ENERGY DETECTOR AND ANALYZER

[75] Inventor: Thomas G. Roberts, Huntsville, Ala.

[73] Assignee: The United States of America as represented by the Secretary of the Army, Washington, D.C.

[21] Appl. No.: 138,967

[22] Filed: Apr. 10, 1980

[51] Int. Cl.³ .......................... G01T 1/18; G01T 1/185
[52] U.S. Cl. ...................................... 250/378; 250/389
[58] Field of Search ............... 250/376, 377, 378, 389, 250/394, 395

[56] References Cited

U.S. PATENT DOCUMENTS

| | | | |
|---|---|---|---|
| 2,696,564 | 12/1954 | Ohmart | 250/389 |
| 2,708,242 | 5/1955 | Ruben | 250/389 |
| 3,585,389 | 6/1971 | Roberts et al. | 250/395 |

OTHER PUBLICATIONS

Mrgudich et al., "A Rechargeable Thin-Film Solid-Electrolyte Battery" Army Service Conference Proceedings 14-17, Jun. 1966, vol. II, pp. 127-139.

Primary Examiner—Alfred E. Smith
Assistant Examiner—Janice A. Howell
Attorney, Agent, or Firm—Nathan Edelberg; Robert P. Gibson; Freddie M. Bush

[57] ABSTRACT

A radiation detector array and a method for measuring the spectral content of radiation. The radiation sensor or detector is an array or stack of thin solid-electrolyte batteries. The batteries, arranged in a stack, may be composed of independent battery cells or may be arranged so that adjacent cells share a common terminal surface. This common surface is possible since the polarity of the batteries with respect to an adjacent battery is unrestricted, allowing a reduction in component parts of the assembly and reducing the overall stack length. Additionally, a test jig or chamber for allowing rapid measurement of the voltage across each battery is disclosed. A multichannel recorder and display may be used to indicate the voltage gradient change across the cells, or a small computer may be used for rapidly converting these voltage readings to a graph of radiation intensity versus wavelength or energy. The behavior of the batteries when used as a radiation detector and analyzer are such that the voltage measurements can be made at leisure after the detector array has been exposed to the radiation, and it is not necessary to make rapid measurements as is now done.

10 Claims, 5 Drawing Figures

RADIATION ENERGY DETECTOR AND ANALYZER

DEDICATORY CLAUSE

The invention described herein may be manufactured, used, and licensed by or for the Government for governmental purposes without the payment to me of any royalties thereon.

BACKGROUND OF THE INVENTION

Charge-particle and X-ray spectrometry of low intensity sources is accomplished using scintillation phosphorus, the luminescence from color centers in single crystals, or by using semiconductors as a surface barrier detector. All of these detectors are used to count pulses, and pulse-height analyses and elaborate electronics are used to record the spectral information.

To measure the spectral content of high intensity pulses like those produced by flash X-ray machines or high intensity relativistic electron beams, stacked thin plates of heavy metals are used. The radiation absorbed in each plate causes the temperature of the plate to increase. Thermocouples are used to measure the temperature rise of each plate and this information is used to calculate the spectral content of the radiation. The thermocouples cannot be hooked to the electronics during a radiation pulse because of the transient high electromagnetic pulses produced by the radiation. Therefore, after the radiation pulse the thermocouples must be recovered and hooked up and the temperatures measured before the thin plates of heavy material cools. Also, the temperatures must not be measured before the plates reach a uniform temperature, and when the radiation is not uniform these plates may cool an unknown amount during this time.

SUMMARY OF THE INVENTION

The radiation energy detector and analyzer is a device for detecting and apparatus for measuring the spectral content of high-intensity, short-duration pulses of radiation such as X-rays, gamma-rays, or other ionizing radiation. This apparatus may also be used for measuring the spectral content of low intensity radiation detected over long exposure times. The detector consists of a stack (array) of rechargeable, solid-electrolyte batteries. The batteries or cells are relatively chemically inert and allow the spectrometer to be mounted in any position relative to the radiation source. Radiation impinging on the detector causes some ionization in the solid-electrolyte of each battery penetrated by the radiation. The ionization is proportional to the intensity and wavelength or energy of the radiation. This ionization results in partial discharge of the batteries, thus decreasing the terminal voltage of each battery. In the analyzer the decreased terminal voltage is recorded and compared with the voltage existing on each battery prior to being exposed to the radiation to determine the change in the voltage ($\Delta V_i$) for each battery (i). These measurements of $\Delta V_i$ can be used to determine the spectrum of the incident radiation.

DESCRIPTION OF THE PREFERRED EMBODIMENT

Figure 1:
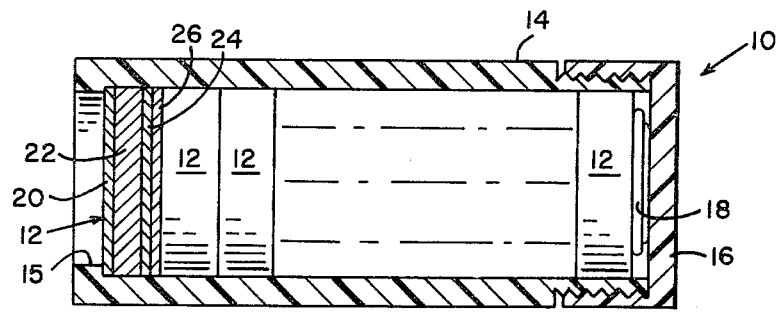
FIG. 1 is a drawing of the detector which comprises a stack of battery cells in an insulator holder.

Referring now to the drawings wherein like numbers refer to like parts, FIG. 1 discloses the detector 10 of the analyzer to be comprised of a stack of batteries in an insulating holder. The stack may be comprised of a variable number of thin, circular, solid-electrolyte batteries 12 removably positioned in an insulated holder 14 such as Teflon. An inwardly projecting rim 15 at one end of holder 14 allows one of the surfaces 20 and 24 of the outermost battery of the stack to be exposed. The holder is closed at the other end by a cap 16. A spring 18 may be used with the cap to keep batteries 14 firmly fixed adjacent each other in the holder. A typical battery (single cell) 12 may comprise a thin film of silver (Ag) 20 bonded to a silver-iodide (AgI) pellet 22, and a thin film of platinum (Pt) 24 bonded to the other side of the pellet 22. Each battery is separated by a thin metal plate 26 which is used as an attenuator only when less spectral resolution than that offered by the batteries alone is desired. It is not necessary to use these metal plates 26 and maximum resolutions in this configuration are obtained when no plates are used. Since there is no external circuit connected to the batteries, it does not matter how the batteries are placed in the holder with respect to electrical polarity. However, it is preferred to place them in an alternating order (such as $+-, -+, +-$; or $-+, +-, -+$, etc.) so that no large voltages exist that might drive any external circuit produced by the radiation.

The batteries employed in detector 10 are similar to those described in an article in IEEE Transactions on Aerospace and Electronic Systems, Volume AES-1, Number 3, December 1965, pages 290–296. The article is entitled "Thin-Film Rechargeable Solid-Electrolyte Batteries." Batteries 12 have long and stable shelf life, therefore the output voltage of each battery is constant in time and each battery is insensitive to temperature changes. Because of the solid electrolyte they can be mounted in any convenient position. A typical battery or cell can be 0.025 centimeters thick and 1¼ centimeters in diameter or less in size.

Figure 2:
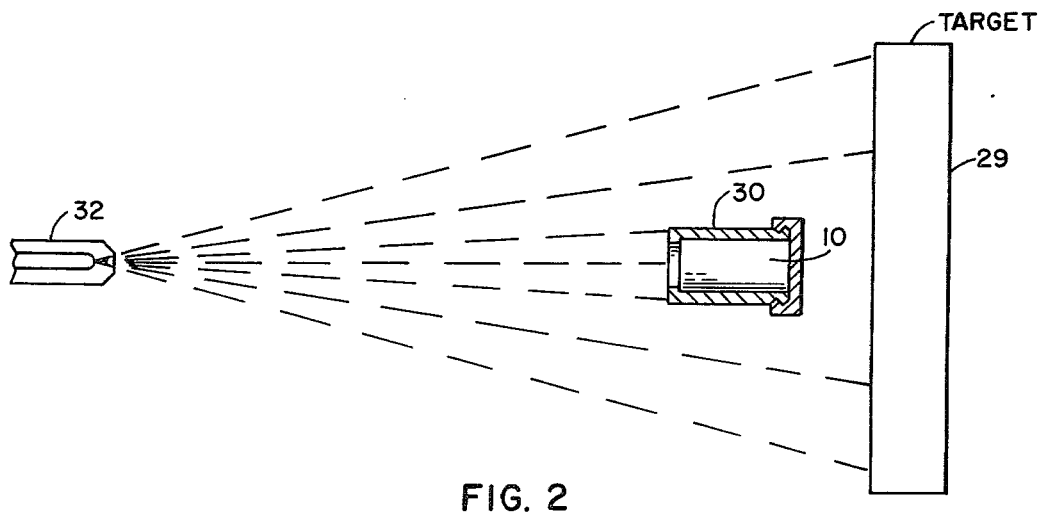
FIG. 2 is a drawing of the stacked detector of the analyzer being radiated.

FIG. 2 shows the detector stack positioned adjacent a target 29 being radiated, such as by a flash X-ray machine 32. The detector 10 may be placed near the target so that radiation impinges substantially perpendicular to the exposed surface of the battery adjacent rim 15. This assures that penetration of the batteries by radiation comes substantially only from the normal to the surface 20 or 24, thereby assuring an accurate measurement of the radiation being analized.

To assure that the radiation wavefront impinges on the cells only from one end of the stack, a lead jacket may be used. The jacket 30 encompasses detector 10 on all sides except the open end of the insulator jacket. Structure of the lead jacket 30 may be identical to that of insulator 14 and cap 16 or any other similar structure which allows proper exposure of one surface of the battery assembly, and retains the assembly within the lead shield, and is readily opened for removal of the detector.

Figure 3:
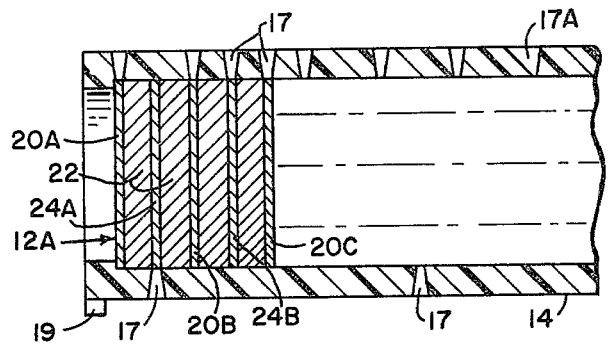
FIG. 3 is a drawing of the detector with the battery cells formed as an integral unit for providing greater spectral resolution.

FIG. 3 shows a battery arrangement where each Ag and Pt thin film serves as a common electrode for two batteries, except for the film on each end of the assembly. This provides a more compact detector and allows maximum spectral resolution. Typically, battery electrodes 20A and 24A function as one set of terminals, electrodes 24A and 20B function as a second set of terminals, electrodes 20B and 24B as a third set of terminals, and electrodes 24B and 20C functions as a fourth set of terminals. Terminals 24A, 20B, and 24B each serve, as shown, as a common terminal for two batteries, providing the (+ −, − +) type of structure. Since these batteries function as detectors and do not have an electrical circuit attached thereto, the batteries cannot be discharged except by external influence, as by radiation. The cylindrical structure of batteries 12 can also readily be placed in an insulating jacket and lead shield. In FIG. 3 jacket 14 is shown having a series of holes 17 selectively spaced therein so that contact probes may be readily inserted to sample the voltages on the batteries without removing them from the jacket 14. Location of the holes may be at any desirable location around the circumference of the insulating jacket as long as it is positioned over the circular edge of elements 20 and 24. With the insulator jacket 14 keyed 19 or notched to slide into a test bed or other monitor structure with a selected fixed position, the holes are readily aligned with test probes which may be projected into the holes to measure the potential on each battery. Typical probe structure may be manually or spring loaded for operation as is well established in the art. For a typical test bed, the jacket 14 may have a guide pin 19 at one or more locations for properly aligning holes 17 with test probes. Also, holes 17 may be tapered to allow a spring loaded probe to readily slide into and out of the hole as shown at 17A.

While a test bed or charging rack may be constructed as noted hereinabove to monitor the detector structure of FIGS. 1 and 3, another structure is shown typically in FIG. 4. A cylindrical housing 40 is made of a plurality of conductive metal washers 42A and 42B spaced apart by insulator washers 44 such as Teflon. Typically, washers 42A are the same thickness as elements 20 and are positioned to align with the edges of elements 20 around the circumference of the electrode. Similarly, elements 22 are aligned with the insulator washers encompassing their edges, and edges of elements 24 are encompassed by conductive washers 42B of equal thickness. With this structure electrical wires 46A and 46B may be placed as desired to provide electrical connection with the respective conductive washers. The assembly 40 may be glued, or otherwise fastened together so as to retain the electrical separation of washers 42A and 42B. For use with the detector structure of FIG. 3 there are, electrically, two external connections at all conductive washers for convenience in measuring the voltages across adjacent cells having a common electrode 20 or 24. Conductors 46A and 46B are then bundled into cable 68 and coupled to charging or testing circuitry as is well established in the art. This basic test bed support structure 40 is shown similar in construction to the insulator jacket 14 of FIGS. 1 and 3. While it need not have this particular structure it must be constructed to allow correct electrical contact between the respective battery terminals and the conductors which provide a readout of the respective battery voltages or which provide a charge thereto. While each battery is adjacent another battery there is no means by which one battery can provide an inadvertent discharge path for itself or another battery. The number of batteries or cells may vary from as few as 5 or 10 to as many as 100, typically. Due to the identical sizes of the battery components the same test facility can monitor all quantities merely by always aligning the batteries from a fixed end such as end 48 of the test bed. Output leads 46 may be electrically wired to the respective conductive washers or may be connected to contact probes which are moved into place when the housing 40 is properly aligned in a support fixture as is well known in the art.

Figure 5:
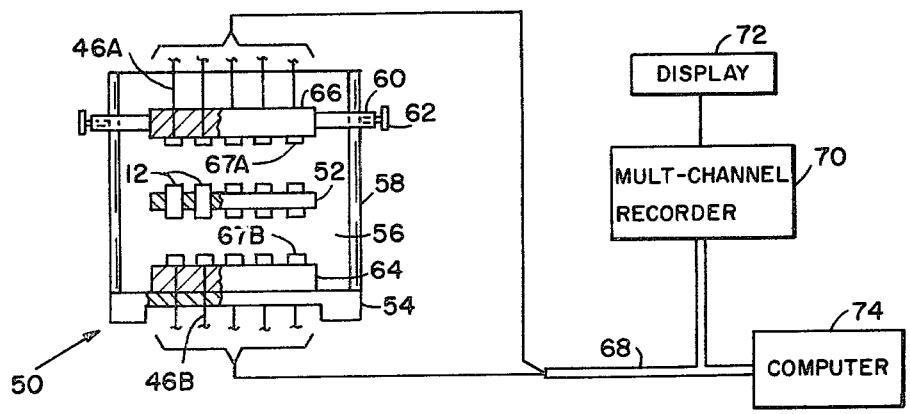
FIG. 5 is a plan view of an alternative apparatus for measuring and recording the change in voltage across individual cells.

FIG. 5 discloses a test fixture for automatically testing an array of individual cells arranged in a plane. Once the battery cells are arranged in the test jig the contacts assembly is moved up to contact the batteries. This structure can be used only with the batteries of FIG. 1, snce the batteries of FIG. 3 have a common electrode between adjacent battery cells and does not come apart.

As shown in FIG. 5 a plurality of batteries 12 are mounted in a test jig 50 for electrical connection to a multichannel recorder 70. Batteries 12 are inserted in a support structure 52. The batteries are disposed in a group of adjacent columns and rows which form a series of evenly spaced columns and rows within a plane. Test jig 50 includes a vertical support structure 54 attached to a bed 56 and to a pair of arms 58 extending over bed 56. A slidable member 60 of jig 50 can be moved along arms 58 and fixed in a desired position such as by screws 62. Support plates 64 and 66 are respectively carried by plate 56 and slidable member 60. A plurality of electrical contacts 67A and 67B are carried respectively by plates 66 and 64 and are aligned in parallel planes that are parallel with batteries 12 and support structure 52 so that an electrical contact is on either side of and approximately coaxial with each battery 12. Electrical leads 46A and 46B are coupled to respective contacts 67A and 67B and are brought together into cable 68. Cable 68, as is also shown in FIG. 4, is then coupled to test circuitry such as multichannel recorder 70. The recorded voltage levels can then be coupled to a graphical or visual display 72 for indicating the terminal voltage of each battery. Visual display 72 may be a component part of the recorder or a remote display. For a large number of batteries or where it is desired to rapidly process the data obtained, the voltages $\Delta V_i$ for each battery may be simultaneously or alternatively coupled directly to a small computer 74 for processing. A detailed description of a structure providing the function of FIG. 5, i.e., measuring the voltages across a plurality of batteries arranged in a plane, is disclosed in U.S. Pat. No. 3,585,389 issued June 15, 1971 to Thomas G. Roberts and Charles M. Rust.

Figure 4:
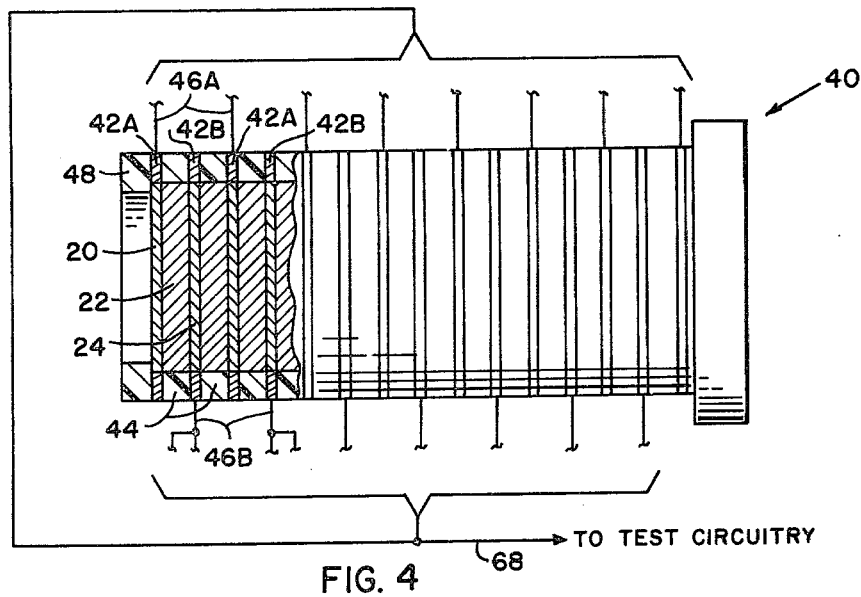
FIG. 4 is a cut-away drawing, diagrammatically showing a holding device used in measuring the change in cell voltage for the detector of FIG. 3 or without removing the batteries from the stack.

The detector of FIG. 3 can be tested only in a structure similar to that of FIG. 4 since these batteries have a common terminal and cannot be separated. The detector of FIG. 1 can be tested in either the test bed structure of FIG. 4 or that of FIG. 5. By bonding the batteries together, keeping them within the insulating jacket, or otherwise keeping them fixedly aligned, the test bed arrangement of FIG. 4 or the probe type of contact used with the insulator jacket (shown in FIG. 3) is appropriate for the detector of FIG. 1. If it is desired to keep the batteries as separate unattached components, which might be desired for replacing, reducing, or increasing the quantity of batteries forming a detector in some tests, the test bed of FIG. 5 is appropriate. In this case the batteries are removed, and placed in parallel, as shown, for testing. The identity and arrangement of each battery should be known to provide appropriate reference and recording of battery data.

In typical operation, a battery stack is placed in the jig structure of FIG. 4 and each battery cell is charged to a low voltage by conventional charging means coupled to appropriate terminals of the test jig. The charged batteries are then stored until needed or if immediate use is expected the open circuit voltage charge across each cell is determined by coupling the multi-channel recorder or computer across the respective cell terminals to measure and record the cell voltages. The recorder is then deactivated and the battery stack is removed from the test jig and placed in the desired environment for radiation. If the battery stack was not already encompassed by a jacket, the insulating jacket and lead shield are placed over the stack before radiation, and alignment of the exposed end is positioned to receive radiation impinging normal to the stack. After the radiation source is pulsed, the stack is removed from its shield and placed in the test jig where the voltages across each battery cell are recorded.

Radiation passing through each cell causes some ionization of the solid electrolyte of the cell which is proportional to the intensity and energy of the radiation which passed through the cell. Thus, the batteries through which radiation passed or entered have a decrease in output voltage level, being partially discharged by the radiation. The higher the energy of the radiation particles being analyzed the more batteries in the stack are affected by the radiation and greater is the resolution obtained.

The difference in the two voltages measured across each battery cell is recorded and may be displayed in any convenient form or processed through the computer to yield the degree or radiation of each cell as a function of the voltage difference.

The range or depth of penetration of a given type of radiation depends on the hardness or energy of the radiation. The higher the energy of the radiation, the deeper it penetrates and the more batteries it affects, producing a decrease in their voltage. Therefore, when the radiation reaching the detector array is composed of radiation at several different energies, the higher energy particles may affect most of the batteries in the stack while the lower energy particles are stopped early in the stack and affect only the first or first few batteries. By knowing the nature of this range-energy relationship, either by theory or by calibration, it is possible to mathematically determine the energy content of the radiation which produces a given set of voltage decreases in the stack of batteries. This range-energy relationship is different for different types of radiation such as gamma rays, electrons, protons, alpha particles, etc. Therefore the detector and analyzer is to be used with only one known type of radiation at any one time.

Examples of this range-energy relationship are discussed in the text Modern Physics by G. E. M. Jauncey published in 1956 by D. Van Nostrand Co. Inc. The text discusses the penetration and absorption of radiation by materials such as aluminum, for example. Chapter 14 includes discussion of absorption of X-rays at page 291-293, pointing out that the hardness of X-rays is determined by their absorption coefficient in various substances. Similarly, alpha, beta, and gamma rays are discussed in Chapter 19. FIG. 19.3 on page 411 shows composite curves for alpha particles indicating four distinct types of alpha particles of different range. This type radiation impinging on the battery stack of the analyzer would result in a decrease in the battery voltages indicative of where the stronger rays penetrated and the weaker rays terminated.

As an example of the manner in which the measured decreases in the voltage of the batteries are used to mathematically determine the energy content of the radiation, gamma rays may be considered as providing a typical example. The attenuation of gamma rays of energy $E_j$ passing through one battery of thickness $\Delta X$ is given by $$I_j = I_{oj} e^{-\alpha_j \Delta X} \quad (1)$$

where $\alpha_j$ is the effective absorption coefficient for a battery for gamma rays of energy $E_j$; $I_{oj}$ is the intensity of the gamma rays of energy $E_j$ reaching the battery; and $I_j$ is the intensity of the gamma rays of energy $E_j$ which penetrate the battery and are available to enter the next battery. Thus, if this battery is the $i^{th}$ battery in the detector, then the decrease in voltage, $\Delta V_{ij}$, due to the passage of gamma rays of energy $E_j$ whose intensity was $I_{oj}$ at the front of the first battery is given by $$\Delta V_{ij} = [e^{-(i-1)\alpha_j \Delta X} - e^{-i\alpha_j \Delta X}] I_{oj} \quad (2)$$

where $\Delta V_{ij}$ is proportional to $\Delta I_{ij}$ the change in intensity of gamma rays of energy $E_j$ in passing through the $i^{th}$ battery. The total change in voltage of the $i^{th}$ battery, $\Delta V_i$, is obtained by summing equation (2) over all the energies in the radiation being analyzed and is given by $$\Delta V_i = \sum_{j}^{n} [e^{-(i-1)\alpha_j \Delta X} - e^{-i\alpha_j \Delta X}] I_{oj} \quad (3)$$

In equation (3) all of the quantities are known, either from measurements such as $\Delta V_i$ and $\Delta X$ or from calibration such as the $\alpha_j$ values, except for the $I_{oj}$ values. Thus, for each battery there is one equation having n unknowns. Letting n be the number of batteries in the detector that are partially discharged by the radiation causes i to run from 1 to n producing a set of an equations in n unknowns, when equation (3) is summed over i. This also fixes the number of energy resolving cells at n. These equations may be written in matrix form as $$\vec{\Delta V} = G \vec{I_o} \quad (4)$$

ps where $\vec{\Delta V}$ is a column vector whose elements are $\Delta V_1, \Delta V_2, \ldots, \Delta V_n$; $\vec{I_o}$ is a column vector whose elements are $I_{o1}, I_{o2}, \ldots I_{on}$; and the elements of the matrix $G$ are given by $$G_{ij} = \sum_{i}^{n} \sum_{j}^{n} [e^{-(i-1)\alpha_j \Delta X} - e^{-i\alpha_j \Delta X}] \quad (5)$$

The matrix equation (4) is solved by standard techniques long known in the art. For relatively small values of n, ($n \leq 4$), equation (4) may be solved manually to produce a plot of $I_o$ versus $E$ or of $I_o$ versus $\lambda$, where $\lambda$ is the wavelength of the gamma rays. The energy and wavelength are related by $E = hc/\lambda$ where $\eta$ is Planck's constant and c is the velocity of light in vacuum. However, for $n>4$, the algorithm for solving equation (4) is very time consuming and the data can be coupled to a computer programmed to solve equation (4) and produce a plot of the spectral content of the radiation, $I_o$ versus E or $I_o$ versus $\lambda$.

Obviously, solid-electrolyte batteries other than Ag-AgI-Pt could be used. For example PbCl or ZrO salts could be used. In fact any salt which shows ion transport but no electronic conductivity can be used. All of these solid electrolytes will provide good miniaturization potential, provides good shelf life, will provide for operation over a large temperature range, and will provide sturdy packaging capability. However, Ag-AgI-Pt has the lowest internal resistance and provides the best battery. It also has reproducible discharge curves when it is repeatedly recharged which allows the detector to be recharged and reused many times. Therefore, while a particular embodiment and form of this invention has been illustrated, it will be obvious to those skilled in the art that modifications may be made without departing from the scope and spirit of the foregoing disclosure. Therefore, it is understood that the invention is limited only by the claims appended hereto.

I claim:

1. A radiation detector comprising: a plurality of batteries arranged coaxially in respective parallel planes forming a stack, each of said batteries being disposed to exhibit a reduction in electrical voltage in response to passage of radiation therethrough, said plurality of batteries being of sufficient stack depth to prevent all radiation impinging coaxially thereon from passing completely through the stack and thereby providing a voltage gradient decrease across the stack indicative of any radiation impinging thereon.

2. A radiation detector as set forth in claim 1 wherein said battery stack is fixedly supported and encompassed by a removable insulating jacket, said jacket having a first end open coaxially with said battery stack for allowing any radiation present to impinge unrestricted on said battery stack therethrough.

3. A radiation detector as set forth in claim 2 wherein said batteries are rechargeable, solid-electrolyte, low voltage batteries, and further comprising a removable lead jacket for substantially encompassing said battery stack and insulating jacket when said battery stack is subject to radiation, said lead jacket having a first end opening adjacent said insulating jacket opening for allowing radiation normal to the exposed surface of said battery stack to impinge thereon.

4. A radiation detector as set forth in claim 2 wherein adjacent battery cells of said plurality of batteries are positioned in opposition such that a positive terminal of one battery adjoins a positive terminal of an adjacent battery and a negative terminal of one battery adjoins a negative terminal of an adjacent battery.

5. A radiation detector as set forth in claim 4 wherein said plurality of batteries positioned in opposition are formed as a composite unit having a common terminal or electrode surface construction between adjacent battery cells, thereby providing a composite structure wherein adjacent batteries having opposing polarities, reducing the thickness of material which radiation must penetrate and thereby increasing resolution of the energy being measured.

6. A radiation detector as set forth in claim 4 wherein said battery stack and insulating jacket are cylindrically shaped, and said batteries are of substantially equal size and dimension and are each single battery cells having respective negative and positive battery surfaces.

7. A radiation detector as set forth in claim 6 wherein the said insulating jacket has a plurality of predetermined, tapered holes, selectively located therein and adapted for receiving an electrically conductive probe therein for contacting respective batteries therethrough, said holes being positioned over the respective edges of said positive and negative battery surfaces for allowing the batteries to be charged or the voltages impressed on the batteries to be obtained without removal of the batteries from the insulating jacket.

8. A radiation detector as set forth in claim 6 and further comprising a removable lead jacket for substantially encompassing said battery stack and insulating jacket when said battery stack is subject to radiation, said lead jacket having a first end opening adjacent said insulating jacket opening for allowing radiation normal to the exposed surface of said battery stack to impinge thereon.

9. A radiation energy analyzer comprising: a housing having a chamber adapted to receive a plurality of battery cells each having respective first and second surface area terminals and arranged coaxially in adjacent parallel planes, said housing having a plurality of electrical contacts positioned for selectively contacting said batteries for providing electrical connection for respective battery cells external of said housing, positioning means removably attached to said housing for precisely positioning batteries within said chamber with respect to said plurality of contacts, and voltage responsive means external of said housing coupled to said electrical contacts for measuring and responding to the open circuit voltage of each of said battery cells.

10. A radiation energy analyzer as set forth in claim 9 wherein said housing is a series of conductive washers and insulative washers arranged alternately to provide insulation between adjacent conductive washers and positioned to provide contact between said battery terminals and selective ones of said conductive washers when batteries are in said housing and said positioning means is attached to the housing, said conductive washers being said electrical contacts.

* * * * *